United States Patent Office 3,840,477
Patented Oct. 8, 1974

3,840,477
HYDROTREATING CATALYST
David G. Braithwaite, Brookhaven, Miss., and Carl F. Cross and Michael R. Basila, Munster, Ind., assignors to Nalco Chemical Company, Chicago, Ill.
No Drawing. Filed Aug. 3, 1972, Ser. No. 277,733
Int. Cl. B01j *11/40*
U.S. Cl. 252—455 R          14 Claims

ABSTRACT OF THE DISCLOSURE

An improved catalyst support and improved results in hydrotreating are obtained by preparing a catalyst comprising alumina surface treated with a very small amount of silica interacted with the alumina.

BACKGROUND

Alumina catalysts useful in a variety of fixed bed hydrotreating operations, e.g., hydrocracking, desulfurization, hydrodenitrogenization and hydrogenation are well known.

Prior art alumina support materials have generally been prepared in the form of extrudates or pellets. Certain types of beaded or spherical alumina catalysts have also been proposed.

The art of making catalysts is highly developed and over the years many improvements have been effected resulting in catalysts of a relatively high degree of sophistication and catalytic activity. In spite of the advanced state of the art, it would be highly desirable to industry to have available hydrotreating catalysts of increased activities, so that a given amount of catalyst will produce an ever-increasing amount of product and thus increase the productivity and improve the economics of the various hydrotreating operations.

OBJECTS

One of the objects of the present invention is to provide a catalyst having an improved activity per unit amount of catalyst.

Another object of the invention is to provide a new and improved method of producing a catalyst of the type described.

Still a further object of the invention is to provide new and useful results in hydrotreating operations. Other objects will appear hereinafter.

BRIEF SUMMARY OF THE INVENTION

In accordance with the invention it has been found that an improved catalyst and catalyst support for use in hydrotreating can be obtained by coating alumina, e.g., extrudates, beads or spheres, usually having a dimension from about 0.01 inch to about 0.50 inch, with a small amount of silica, the amount of silica, as $SiO_2$, in the resultant catalyst, after drying and calcining, being sufficient to enhance the activity of the alumina in hydrotreating but usually less than 2.5% by weight of the alumina, as $Al_2O_3$, usually within the range of about 0.2% to 1.2% by weight. The catalyst is preferably prepared under conditions adapted to produce interaction between the silica and the alumina, as hereafter described.

DETAILED DESCRIPTION OF THE INVENTION

In practicing the invention it is desirable to effect interaction of the alumina with the silica by contacting the alumina in the form of an extrudate, spheres or beads with a chemical reagent which tends to solubilize the alumina at its surface so that the possibility of interaction between the alumina and the silica is enhanced. To accomplish this, the alumina beads or spheres or extrudate either before, during or after the addition of silica as a silica sol or sodium silicate are brought into contact with an activating agent which is effective to make the alumina more reactive with silica, either by converting a portion of the alumina to a water soluble state or by adding a water soluble alumina compound. It will be understood, therefore, that the term "activating agent" as used herein is intended to include and cover various types of substances which will function for the aforesaid purpose. Thus, it has been found that organic acids such as acetic acid and formic acid which form water soluble aluminum salts can be employed for this purpose. A strong organic base such as, for example, tetramethylammonium hydroxide can also be used. Another substance which can be employed as an activating agent is chlorohydrol which is a 50% by weight solution of hydrolyzed aluminum chloride containing aluminum hydroxide and aluminum chloride usually in a ratio of about one Cl per one or two Al. Another type of activating agent which can be employed is aluminum isopropoxide dissolved in ethylene glycol monoethylether (ethyl Cellosolve) by boiling to eliminate the isopropyl alcohol.

A wide range of aqueous colloidal silica sols can be used in practicing the invention. The ultimate particle size of the silica sol particles can range from 2 to 150 millimicrons and the surface area from 50 to 700 m.$^2$/g. The sol can vary widely in $SiO_2$ concentration, e.g., from 1 to 50% by weight as $SiO_2$.

Typical aqueous colloidal silica sols useful in preparing the catalysts of the invention are set forth below in Table I:

TABLE I

| Nalcoag | 1030 | 1034A | 1035 | 1050 | 1060 | 1130 | 1140 |
|---|---|---|---|---|---|---|---|
| Percent colloidal silica, as $SiO_2$ | 30 | 34 | 35 | 50 | 50 | 30 | 40 |
| pH | 10.2 | 3.1 | 8.6 | 9.0 | 8.5 | 10.0 | 10.0 |
| Average particle size, millimicrons | 11–16 | 16–22 | 16–22 | 17–25 | 40–60 | 8 | 15 |
| Average surface area, m.$^2$/gram | 190–270 | 135–190 | 135–190 | 120–176 | 50–75 | 375 | 200 |
| Specific gravity at 68° F. | 1.205 | 1.230 | 1.255 | 1.385 | 1.390 | 1.214 | 1.296 |
| Viscosity at 77° F., cps. | <5 | <5 | 5 | 70 | 5–10 | 7 | 8 |
| $Na_2O$, percent | 0.4 | <0.01 | 0.10 | 0.30 | 0.10 | 0.65 | 0.40 |

In the silica sols given in Table I the liquid carrier for the $SiO_2$ particles is water but the sol can also be one in which at least a portion of the water is replaced by a water miscible alcohol or glycol. For example, Nalcoag 1129 can be used which is an acid sol generally similar to Nalcoag 1034A except that a part of the water is replaced with isopropanol so that instead of water as a liquid carrier for the $SiO_2$, the sol contains 40% to 50% isopropanol.

Since the amount of silica being added to the alumina in the form of a sol is extremely small, it is usually necessary to provide additional liquid carrier in the form of water or an aqueous solution of the activating agent in order to coat the alumina spheres.

While the activating agent can be added to the alumina shaped particles prior to the addition of the silica sol, it is usually more convenient to add the activating agent and silica sol simultaneously. Usually, therefore, the activating agent is mixed with the silica sol and the mixture is added to the alumina which is in the form of beads or spheres or an extrudate. The coated alumina particles are then dried and finally calcined. The drying step is preferably done at a temperature of at least 180° C. for one hour. Longer drying times and higher or lower temperatures can be used. For example, the drying step might be conducted at temperatures of 30° C. to 180° C. with a longer drying time being required at the lower temperatures and a shorter drying time at the higher temperatures. The drying step removes enough moisture so that on subsequent calcining the evolution of water does not become too violent.

Calcining should be at temperatures in excess of 480° C. (ca. 900° F.) and preferably above 538° C. (ca. 1000° F.). A temperature of 594° C. (ca. 1100° F.) achieves good results.

Where the activating agent is acidic, it is desirable to use an acidic silica sol. It is also desirable that the finished catalyst contain a low amount of sodium. Silica sols such as Nalcoag 1129 and Nalcoag 1034A are preferred for the practice of the invention.

The amount of water or other water miscible carrier used with the silica particles should be sufficient so that the alumina particles are thoroughly wet. In any event, however, the amount of silica is less than 2.5% by weight of the alumina.

The mixing of the alumina shaped particles with the silica sol and activating agent should be such as to insure intimate contact and coating of the alumina.

In order to evaluate the invention silica coated alumina spheres and alumina extrudates were subjected to a standard testing method in a hydrotreating process wherein the volume activity and weight activity of the catalyst of the invention were compared respectively with the volume activity and weight activity of a standard catalyst. The ratios of the respective activities then give a basis for determining the amount of enhanced activity. In the following examples it will be understood that the volume activities and the weight activities are ratios of the activity of the catalyst tested to a standard catalyst having an activity of 1.0.

The invention will be further illustrated but is not limited by the following examples in which the quantities are stated in parts by weight unless otherwise indicated.

EXAMPLE I 500 grams of alumina spheres of approximately 1/8" diameter were mixed with 5 ml. of Nalcoag 1034A and then with 500 grams and 50% acetic acid. The mixture was dried and then calcined at 1100° F. for 2 hours.

EXAMPLE II 5 ml. of Nalcoag 1034A was mixed with 500 grams of a 25% aqueous solution of tetramethylammonium hydroxide and the resultant mixture was then mixed with 500 grams of 1/8" diameter alumina spheres and allowed to air dry. The resultant product was then dried at 180° C. for one hour and finally calcined at 1100° F. for 2 hours.

EXAMPLE III 500 grams of a 14% aluminum isopropoxide solution in ethyl Cellosolve was prepared by boiling the alumnum propoxide in the ethyl Cellosolve with the elimination of isopropyl alcohol. 1.7 grams of Nalcoag 1129 was added to this solution and the resultant mixture was then mixed with 500 grams of 1/8" diameter alumina spheres. Thereafter the coated alumina spheres were dried at 180° C. for 2 hours and finally calcined at 1100° F. for 2 hours.

EXAMPLE IV

The procedure was the same as in Example I except that 8 grams of 50% aqueous solution of gluconic acid was added to the mixture, the gluconic acid being added in this case as a stabilizing agent.

EXAMPLE V 14 grams of Nalcoag 1034A were mixed with 200 grams of a 50% aqueous solution of chlorhydrol and 300 grams of water. At this point a clear, slightly opalescent solution resulted. This was mixed with 500 grams of 1/8" diameter alumina spheres. As these dried, the coated spheres became very sticky and formed clumps. After drying at 180° C. for one hour and calcining at 1100° F. for 2 hours, all tendencies to stick together disappeared.

EXAMPLE VI 20 grams of Nalcoag 1034A were mixed with 50 grams of formic acid and 450 grams of water. This mixture was then mixed with 500 grams of alumina spheres averaging 1/8" in diameter and allowed to air dry overnight. The coated spheres were then dried at 180° C. for 2 hours and calcined at 1100° F. for 2 hours.

EXAMPLE VII 52 grams of silica acid sol (7% by weight $SiO_2$) were mixed with 1500 grams of water. The diluted sol was then mixed with 600 grams of alumina spheres. The temperature of this mixture was raised to 180° F. and held at 180°±2°F. for one hour. The liquid was drained from the spheres. The spheres were dried at 300° F. for two hours and calcined at 1000° F. for two hours.

EXAMPLE VIII 70 grams of sodium silicate solution (28.5% $SiO_2$ by weight) were mixed with 12.0 grams of sodium hydroxide pellets and 5000 grams of water. To this solution, 2040 grams of dry alumina powder were added. The temperature of this mixture was raised to 180° F. and held at 180°±2° F. for one hour with constant stirring. The liquid was removed by filtration, and 5000 ml. of water were passed through the resulting filter cake to remove any residual sodium hydroxide or sodium silicate. The material was oven dried, after which a small amount of water was added to adjust the moisture of the material to a level suitable for extrusion. The alumina was extruded into cylindrical particles about 1/8" long and 1/16" thick. The resulting formed alumina was calcined in air at 1000° F. for two hours.

EXAMPLE IX 246 grams of silica acid sol (7.0% $SiO_2$ by weight) were mixed with 5000 grams of water. The quantity of 2040 grams of dry alumina powder was added to this solution. The temperature of this mixture was raised to 180° F. and held at 180°±2° F. for one hour with constant stirring. The liquid was removed by filtration and 5000 ml. of water were passed through the resulting filter cake to remove any residual unreacted silica. The material was oven dried. The material was extruded after adding a suitable amount of water. The extruded alumina was calcined in air at 1000° F. for two hours.

EXAMPLE X 8 grams of sodium silicate were mixed with 1.5 grams of sodium hydroxide pellets and 500 grams of water. This solution was then mixed with 227 grams of 1/16" alumina pellets. The mixture was allowed to stand for one hour. The liquid was decanted and the pellets were then dried at 300° F. for two hours and calcined at 1000° F. for an additional two hours.

EXAMPLE XI 28 grams of silica acid sol (7% by weight $SiO_2$) were mixed with 500 grams of water. The diluted sol was then mixed with 227 grams of 1/16" alumina pellets. The mixture was allowed to stand for one hour after which the liquid was drained off. The pellets were dried at 300° F. for two hours and calcined at 1000° F. for two hours.

Hydrodesulfurization catalysts were prepared by impregnating each of the catalyst supports in the foregoing examples with cobalt and molybdenum by conventional methods, thereafter drying the catalyst at 300° F. for two hours and finally calcining at 1100° F. for two hours. Evaluation data is given in Table II in which SA is surface area in square meters per gram and PV is pore value in cc. per gram. The last column gives the comparative data for a standard catalyst where there was no silication of the alumina catalyst support.

treating activity of said catalyst, and contacting said alumina particles before, during or after said mixing with an activating agent in the form of a compound effective to make the alumina more reactive with the silica of said silica sol either by converting a portion of the alumina to a water soluble state or by coating the alumina with a water soluble aluminum compound, said activating agent being selected from the group consisting of acetic acid, formic acid, aluminum isopropoxide, chlorohydrol and tetramethylammonium hydroxide.

TABLE II

| Example | I | II | III | IV | V | VI | VII | VIII | IX | X | XI | Standard catalyst, no silication |
|---|---|---|---|---|---|---|---|---|---|---|---|---|
| $MoO_3$ | 12.2 | 13.0 | 13.1 | 13.6 | 13.2 | 13.0 | 13.3 | 12.5 | 12.7 | 11.2 | 10.8 | 11.3 |
| CoO | 3.6 | 3.5 | 3.5 | 3.6 | 2.8 | 3.5 | 3.5 | 3.3 | 3.0 | 2.6 | 2.9 | 2.8 |
| $SiO_2$ | .7 | .75 | .2 | .8 | .3 | 2.0 | .7 | .9 | .7 | .8 | 1.0 | 0 |
| $Al_2O_3$ | 83.0 | 83.0 | 83.0 | 82.0 | 84.0 | 81.0 | 82.0 | 82.0 | 83.0 | 85.0 | 84.0 | 85.0 |
| Percent $SiO_2$ to $Al_2O_3$ | .84 | .90 | .24 | .98 | .36 | 2.47 | .85 | 1.1 | .84 | .94 | 1.2 | 0 |
| SA | 210 | 220 | 205 | 170 | 210 | 195 | 240 | 190 | 205 | 180 | 180 | 180 |
| PV 1200, A.* | .69 | .56 | .67 | .67 | .68 | .68 | .66 | .53 | .48 | .47 | .46 | .47 |
| PV 100 A.** | .20 | | .21 | .18 | .21 | .18 | .26 | .22 | .25 | .21 | .22 | .18 |
| Apparent bulk density (g./ml.) | .53 | .60 | .54 | .53 | .53 | .53 | .54 | .72 | .72 | .74 | .75 | .7 |
| Vol. activity | 1.3 | 1.3 | 1.3 | 1.3 | 1.2 | 1.1 | 1.2 | 1.6 | 1.3 | 1.2 | 1.1 | 1.0 |
| Wt. activity | 1.2 | 1.1 | 1.2 | 1.2 | 1.1 | 1.0 | 1.1 | 1.6 | 1.3 | 1.3 | 1.2 | 1.0 |

*PV less than 1,200 A.  **PV less than 100 A.

In the foregoing examples, the alumina consists essentially of pure alumina ($Al_2O_3$). Compositions which are useful and procedures for preparing the beads or spheres include materials and processes described in one or more of U.S. Pats. 2,996,460, 2,988,520, and 3,520,654. It should be understood that the invention is not limited to any particular method of preparing the beads or spheres or extrudates.

The silica coated alumina particles prepared as described herein can be used as such in hydrotreating processes or they can be used as catalyst supports for catalytically active metals, including one or more of the following:

| | |
|---|---|
| Ni | Sn |
| Co | W |
| Fe | Mg |
| Mn | Re |
| Cr | Ir |
| V | Os |
| Cu | Pt |
| Zn | Pb |
| Mo | Bi |
| Pd | Rare earths |
| Cd | |

For instance, as previously described, a hydrodesulfurization catalyst is made by depositing cobalt and molybdenum upon the catalyst support.

The term "hydrotreating" refers to a reaction wherein mixtures of hydrocarbons are contacted with a catalyst in the presence of added hydrogen at elevated temperatures and pressures. In hydrocracking, which is one form of hydrotreating, higher boiling hydrocarbons are converted to lower boiling products. In desulfurization, the purpose of the hydrotreating process is to remove sulfur from the hydrocarbons. In hydrodenitrogenization the purpose of the hydrotreating process is to remove nitrogen compounds from the hydrocarbons. In hydrogenation the purpose of the hydrotreating process is to add hydrogen to the chemical structure of the hydrocarbons or to cause a rearrangement of the chemical structure by the addition of hydrogen.

The invention is hereby claimed as follows:

1. A process of preparing a catalyst or catalyst support which comprises mixing preformed alumina particles with silica sol in an amount sufficient to form a surface coating of $SiO_2$ on said alumina which coating after drying and calcining constitutes less than 2.5% $SiO_2$, based on the weight of $Al_2O_3$ but is sufficient to enhance the hydro- 2. A process as claimed in claim 1 in which said alumina particles have a diameter of from about 0.01 inch to about 0.50 inch.

3. A process as claimed in claim 1 in which said alumina particles are in spherical form.

4. A process as claimed in claim 1 in which said alumina particles are extrudates.

5. A process as claimed in claim 1 in which said activating agent is acetic acid.

6. A process as claimed in claim 1 in which said activating agent is formic acid.

7. A process as claimed in claim 1 in which said activating agent is tetramethylammonium hydroxide.

8. A process as claimed in claim 1 in which said activating agent is an aluminum isopropoxide solution obtained by boiling aluminum isopropoxide in ethylene glycol monoethylether with the elimination of isopropyl alcohol.

9. A process as claimed in claim 1 in which said added activating agent is chlorohydrol.

10. A process as claimed in claim 1 in which said silica sol is applied as an acidic silica sol.

11. A hydrotreating catalyst or catalyst support obtained according to the process claimed in claim 1.

12. A hydrotreating catalyst comprising a catalyst support as claimed in claim 11 and a catalytically active metal other than aluminum, said catalytically active metal being selected from the group consisting of Ni, Co, Fe, Mn, Cr, V, Cu, Zn, Mo, Pd, Sn, W, Mg, Re, Ir, Os, Pt, Pb, Bi, and rare earths.

13. A hydrotreating catalyst as claimed in claim 12 wherein said catalytically active metal comprises cobalt and molybdenum.

14. A process as claimed in claim 1 in which the $SiO_2$ is 0.2% to 1.2% by weight of the alumina.

References Cited
UNITED STATES PATENTS

| | | | |
|---|---|---|---|
| 2,216,262 | 10/1940 | Bloch et al. | 252—451 |
| 2,852,473 | 9/1958 | Welling | 252—451 |
| 3,650,989 | 3/1972 | Hindin et al. | 252—451 |
| 3,598,759 | 8/1971 | Bertolacini | 252—455 R |
| 3,560,370 | 2/1971 | Billon et al. | 252—455 R |
| 3,657,153 | 4/1972 | Bucur et al. | 252—455 R |
| 3,662,002 | 5/1972 | Magerlein et al. | 252—455 R |

CARL F. DEES, Primary Examiner